United States Patent [19]
Sakamoto

[11] Patent Number: 5,793,947
[45] Date of Patent: Aug. 11, 1998

[54] PROGRAMMABLE CONTROLLER FOR SYNCHRONOUSLY TRACING THE EXECUTION OF OPERATION BLOCKS AND SFC PROGRAM EXECUTION METHOD USING THE PROGRAMMABLE CONTROLLER

[75] Inventor: Noboru Sakamoto, Aichi, Japan

[73] Assignee: Mitsubishi Denki Kabushiki Kaisha, Tokyo, Japan

[21] Appl. No.: 223,101

[22] Filed: Apr. 4, 1994

[30] Foreign Application Priority Data

Apr. 2, 1993 [JP] Japan .................. 5-077019

[51] Int. Cl.$^6$ ............................ G06F 11/34
[52] U.S. Cl. .............. 395/183.21; 364/474.03; 364/474.11; 364/474.16; 395/183.13; 395/183.14; 395/551; 395/704
[58] Field of Search .............. 364/474.03, 474.11, 364/474.19, 474.16; 395/183.13, 183.14, 183.21, 530, 700, 551, 704

[56] References Cited

U.S. PATENT DOCUMENTS

| | | | |
|---|---|---|---|
| 5,047,919 | 9/1991 | Sterling et al. | 395/184.01 |
| 5,168,554 | 12/1992 | Luke | 395/161 |
| 5,426,730 | 6/1995 | Miyake et al. | 395/159 |
| 5,438,574 | 8/1995 | Taniguchi | 395/183.14 |

FOREIGN PATENT DOCUMENTS

| | | |
|---|---|---|
| 0435139A2 | 12/1990 | European Pat. Off. . |
| 0435139 | 7/1991 | European Pat. Off. . |
| 0458132 | 11/1991 | European Pat. Off. . |
| 0496097A2 | 12/1991 | European Pat. Off. . |
| 3401784 | 8/1984 | Germany . |

*Primary Examiner*—Kenneth S. Kim
*Attorney, Agent, or Firm*—Sughrue,Mion,Zinn,Macpeak & Seas, PLLC

[57] ABSTRACT

The present invention provides a programmable controller for executing an SFC program. The programmable controller has a memory which stores a step trace program for storing and tracing a history of execution statuses of active steps of a plurality of blocks of an SFC during execution of the SFC program. The step trace program comprises a step trace setting subprogram which, through the use of a peripheral device, synchronously traces the execution statuses of the active steps of the plurality of blocks. The step trace program further comprises a step trace execution subprogram which creates step trace data based on the execution statuses of active steps traced by the step trace setting device. The programmable controller further comprises a step trace display device for displaying the step trace data. Hence, an operator can simultaneously view the execution status of active steps of a plurality of blocks of the SFC to thereby determine which active steps have been executed at any given time.

14 Claims, 15 Drawing Sheets

FIG. 3

| SYNCHRONOUS BLOCK-TO-BLOCK STEP TRACE SETTING SCREEN | | ~24 |
|---|---|---|
| BLOCK | TRIGGER STEP | |
| B1 | S2 | |
| B2 | * | |
| B3 | * | |
| B4 | * | |

| F1:READ | F2:DISPLAY | F3: | F4:EXECUTE | | |
|---|---|---|---|---|---|

FIG. 4

| SYNCHRONOUS GROUP STEP TRACE SETTING SCREEN | | | ~25 |
|---|---|---|---|
| BLOCK | TRIGGER STEP | GROUP DESIGNATION | |
| B1 | S2 | 1 | |
| B2 | * | 1 | |
| B3 | S3 | 2 | |
| B4 | * | 2 | |

| F1:READ | F2:DISPLAY | F3: | F4:EXECUTE | | |
|---|---|---|---|---|---|

FIG. 5

JOINT TRIGGER STEP TRACE SETTING SCREEN ~26

| BLOCK | TRIGGER STEP | GROUP DESIGNATION |
|---|---|---|
| B1 | S2 | 1 |
| B2 | S4 | 1 |
| B3 | S3 | 2 |
| B4 | S5 | 2 |

| F1:READ | F2:DISPLAY | F3: | F4:EXECUTE | | |
|---|---|---|---|---|---|

FIG. 6

MASTER/SLAVE BLOCK JOINT ACTIVATION STEP TRACE SETING SCREEN ~27

| BLOCK | TRIGGER STEP | MASTER/SLAVE JOINT ACTIVATION DESIGNATION |
|---|---|---|
| B1 | S2 | YES |
| B2 | S4 | YES |
| B3 | S3 | NO |
| B4 | S5 | NO |

| F1:READ | F2:DISPLAY | F3: | F4:EXECUTE | | |
|---|---|---|---|---|---|

FIG. 7
| STEP TRACE DISPLAY SCREEN | | | | | | | | | |
|---|---|---|---|---|---|---|---|---|---|
| BLOCK | -4 | -3 | -2 | -1 | 0 | +1 | +2 | +3 | +4 |
| B1 | S0 | S0 | S1 | S1 | S2 | S3 | S3 | S4 | S5 |
| B2 | S0 | S1 | S2 | S2 | S3 | S4 | S4 | S5 | S6 |
| B3 | S1 | S2 | S3 | S4 | S5 | S5 | S6 | S6 | S7 |
| B4 | S1 | S1 | S2 | S3 | S4 | S5 | S6 | S7 | S7 |
| F1:READ | F2:DISPLAY | F3: | F4: | | |
FIG. 17
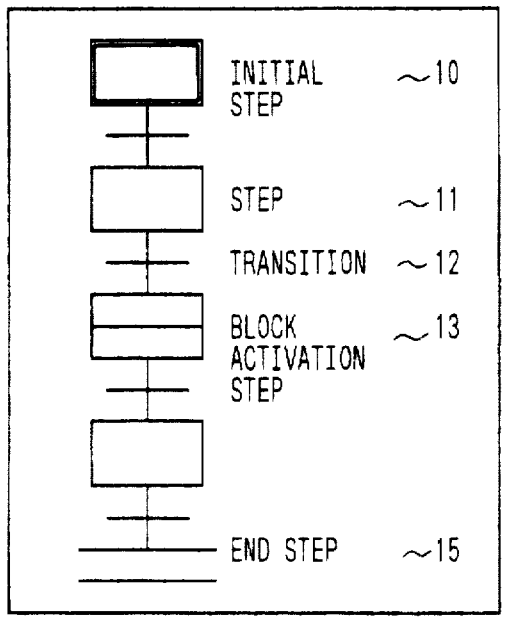
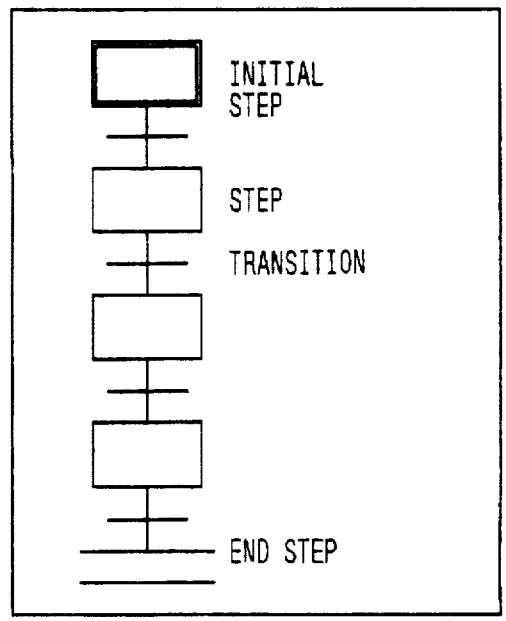

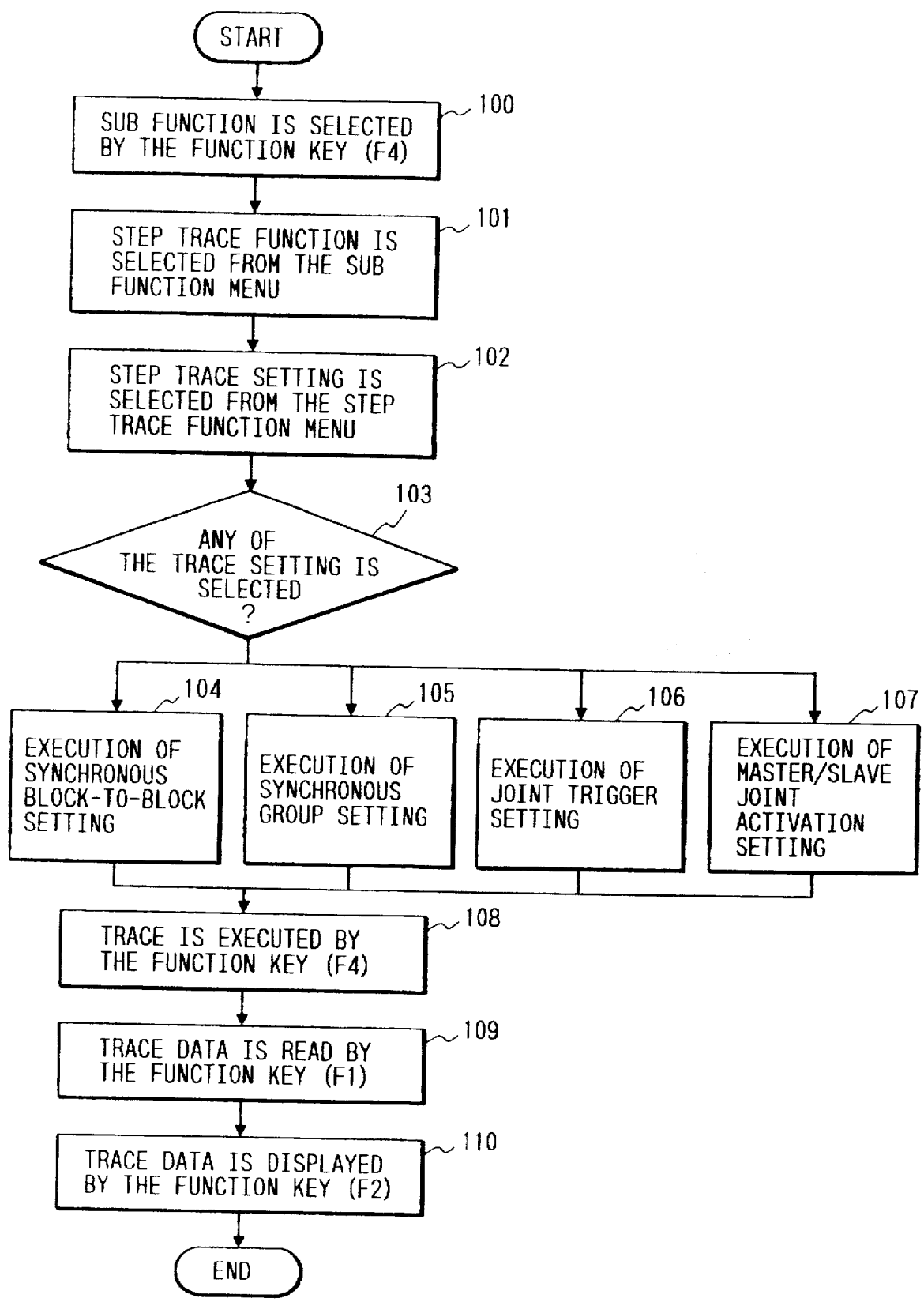

FIG. 18

| STEP TRACE SETTING SCREEN | | ~91 |
|---|---|---|
| BLOCK | TRIGGER STEP | |
| B1 | S2 | |
| B2 | S3 | |
| B3 | S5 | |

| F1:READ | F2:DISPLAY | F3: | F4:EXECUTE | | |

| STEP TRACE DISPLAY SCREEN | | | | | | | | |
|---|---|---|---|---|---|---|---|---|
| BLOCK | -4 | -3 | -2 | -1 | 0 | +1 | +2 | +3 | +4 |
| B1 | S0 | S0 | S1 | S1 | S2 | S3 | S3 | S4 | S5 |
| B2 | S0 | S1 | S2 | S2 | S3 | S4 | S4 | S5 | S6 |
| B3 | S1 | S2 | S3 | S4 | S5 | S5 | S6 | S6 | S7 |

| F1:READ | F2:DISPLAY | F3: | F4: | | |

PROGRAMMABLE CONTROLLER FOR SYNCHRONOUSLY TRACING THE EXECUTION OF OPERATION BLOCKS AND SFC PROGRAM EXECUTION METHOD USING THE PROGRAMMABLE CONTROLLER

BACKGROUND OF THE INVENTION

1. Field of the Invention

The present invention relates to a programmable controller for executing, as a user program, an SFC (Sequential Function Chart) program written in an SFC language, that is, a stepwise advance-type language, and to a method for executing the SFC program using the programmable controller.

2. Description of the Related Art

Programmable controllers exist in the art which are capable of executing SFC programs. In such apparatuses, the SFC program is typically written into the programmable controller by a peripheral device.

FIG. 14 is a block diagram illustrating a programmable controller comprising a CPU 1 for executing the SFC program, an input/output interface 2 for transferring data to and from an object to be controlled and a peripheral device (both not shown), and a microprogram ROM for storing a microprogram acting as an operating system for controlling the CPU 1. The programmable controller further comprises a RAM 4 for storing executed steps during the execution of the SFC program, a RAM 5 for storing programs, and common bus 6 for coupling the CPU 1, input/output interface 2, microprogram ROM 3, executed step storing RAM 4 and the program storing RAM 5.

FIG. 15 illustrates the contents of the microprogram in microprogram ROM 3. Block execution program 31 controls and executes all blocks (the blocks will be described later in detail), active step execution program 32 detects and executes the active steps of the blocks, and step trace execution program 33 traces the executed steps. The step trace execution program 33 comprises trigger step detection program 34 for detecting whether the executed step is a trigger step, after-trigger trace count program 35 for counting the number of traces so that traces are continued at the number of specified steps in order to trace steps executed after a trigger step, and executed step storage program 36 for causing the executed steps to be stored in the executed step storing RAM 4.

FIG. 16 illustrates the contents of the executed step storing RAM 4. RAM 4 comprises step trace status data 41 indicating the execution state of the step trace, trigger step storage address data 42 indicating an address where the trigger step is stored, executed step storage pointer data 43 indicating an address where a step to be executed next is stored, and an executed step storage table 44 where the executed steps are stored.

FIG. 17 shows an example of the SFC program. The SFC program, representing sequence control in a flow format, comprises a combination of steps, indicating particular operations, and transitions indicating transition conditions for advancing execution from one step to another. A step being executed is referred to as the active step. When its accompanying transition condition is enabled, the active step is deactivated and the execution shifts to a subsequent step.

In FIG. 17, for example, step 11 is associated with transition 12. A sequence of steps is represented as a block 16, the first step in the block being the initial step and the final step being the end step. The block is activated by an activation request from another block and ends when execution has progressed from the initial step 10 to the end step 15. A plurality of blocks can be activated and processed concurrently. The block activation request is provided by the execution of a block activation step, for example, block activation step 13. The block activation step 13 is active while a block which the block activation step 13 activates is being executed, and is deactivated on the termination of the activation of that block, at which time the execution shifts to a subsequent step.

FIG. 18 illustrates an example of a step trace setting screen 91 on which blocks to be traced and corresponding trigger steps are set in a step trace setting for a conventional step trace function. FIG. 19 illustrates a step trace display screen in a step trace display device in the peripheral device (not shown). The step trace stores a history of the execution of active steps, executed sequentially as the corresponding transition conditions are enabled, and subsequently traces them on the display of the peripheral device.

FIG. 20 is a flowchart showing a sequence of operations wherein the programmable controller executes the SFC program loaded from the peripheral device (not shown) and simultaneously stores the active steps of the specified blocks. The operation of the conventional apparatus will now be described.

On a step trace setting screen 91 shown in FIG. 18, the blocks to be step-traced are set in the block section. In this figure, B1, B2 and B3 represent block 1, block 2 and block 3, respectively. Because a plurality of blocks can be activated concurrently, a plurality of blocks to be traced can be set. In the trigger step section, steps which cause the step trace of the corresponding blocks to be executed are set. Here S0 to S7 represent steps 0 to 7.

After a trigger step for a particular block has been executed, the CPU traces the set number of steps (not shown), and the execution history of the preceding and succeeding steps in reference to that trigger step can be traced and displayed by the peripheral device as shown on the step trace display screen 92 in FIG. 19.

FIG. 21 illustrates an example of an SFC program 93 to be traced. In this program, blocks 1, 2 and 3 are activated concurrently by block 0 and the blocks activated are executed concurrently. Trace data is stored per block, and traced and displayed in reference to the respective trigger steps. The trace display of each block is provided with reference to a scan in which the trigger step of each block is executed, and unless the trigger steps of the blocks are executed in the same scan, the trace displays of the blocks do not share a time axis. Therefore, when step 2 (S2) of block 1 (B1) is executed on the step trace display screen 92, step 3 (S3) of block 2 (B2) is not always executed at the same time and thus, the synchronization of block-to-block step execution cannot be confirmed.

FIG. 20 is a flowchart illustrating a sequence of operations of an SFC program known in the art.

As shown in step 200, the number of active blocks to be processed by the block execution program 31 is read. Then, in step 201, the number of active steps to be executed by the active step execution program 32 is read.

Subsequently, the active steps are read and executed in step 202. In step 203, it is determined whether the step trace status data 41 indicates that the step trace is before a trigger step (before-trigger status) or after a trigger step (after-trigger status). If the step trace status data 41 indicates the before-trigger status, the processing progresses to step 204 where the trigger step detection program 34 determines whether the executed step is a trigger step.

However, if the step trace status data 41 indicates the after-trigger status, in step 205, the after-trigger trace count program 35 counts the number of executed steps traced after the trigger step. When the after-trigger trace count program 35 determines that all the executed steps after the trigger step have been traced, the step trace of the corresponding block is completed.

When, in step 204, the executed step is determined to be a trigger step, the step trace status data 41 is changed to the after-trigger status, and the trigger step storage address 42 is set to the address indicated by the executed step storage pointer data 43, which is the address of the executed step.

Subsequently, in step 206, the executed step number is stored in the executed step storage table 44 in the executed step storage RAM 4 by the executed step storage program 36 in cooperation with the executed step storage pointer 43. In step 207, it is determined if all the steps of the block have been executed. If not, the processing returns to step 202, and the above processing is repeated for the next step in the block.

If, in step 207, it is determined that all the steps in a block are completed, the processing proceeds to step 208. In step 208, it is determined whether all blocks are completed. If so, the processing ends. However, if all blocks are not completed, the processing returns to step 201 and is repeated for the next block.

As evident from the above, when the step trace of a corresponding block is completed, the history of the active steps executed has been stored into the executed step storage table 44 in the form of step numbers. The step stored at the address indicated by the trigger step storage address data 42 is the trigger step, and the step stored at the address indicated by the executed step storage pointer data 43 is the step executed on completion of the trace. This data stored in the executed step storage table 44 is read by the peripheral device, and the trigger step along with the active steps executed before and after that trigger step are displayed for each block as shown in FIG. 18.

As described above, in the conventional programmable controller (PC), the step trace for each block is begun when the corresponding trigger step for that block is executed. However, since the trigger steps of the blocks are not always executed simultaneously, the trace display cannot always be used to illustrate that a step of one block is being executed concurrently with a step of another block.

For example, an advance/return operation of a transfer station and a rise/fall operation of a clamp in a transfer machine can be designated as blocks, respectively, and the steps of these operation blocks can be controlled concurrently in synchronization with each other. In the conventional PC described above, the operation status of these blocks cannot be displayed concurrently on a trace display screen. Hence, the execution of the steps cannot be confirmed by an operator viewing the display.

SUMMARY OF THE INVENTION

Accordingly, it is an object of the present invention to overcome the above disadvantage of the conventional PC by providing a programmable controller which matches trigger timings between blocks in the step trace execution of the SFC program to provide synchronized display of the steps in the blocks.

To achieve this object, a programmable controller of a first embodiment of the present invention comprises a step trace setting program which synchronously traces the execution statuses of the steps of a plurality of blocks specified by a peripheral device. The controller further comprises a step trace execution program which creates step trace data based on the execution statuses of the steps traced by the step trace setting program, and a step trace display for displaying the step trace data generated by said step trace execution program.

A programmable controller of a second embodiment of the present invention comprises a synchronous block-to-block step trace setting program which synchronously traces the execution statuses of the steps of a plurality of blocks when a trigger step of a predetermined block is executed. The programmable controller further comprises a synchronous block-to-block step trace execution program which creates step trace data based on the execution statuses of the steps traced by the block-to-block step trace setting program, and a step trace display for displaying the step trace data generated by the synchronous block-to-block step trace execution program.

A programmable controller of a third embodiment of the invention comprises a synchronous group step trace setting program which groups blocks to be synchronized, sets a trigger step for each group and traces the execution statuses of the steps in those groups. The programmable controller further comprises a synchronous group step trace execution program which creates step trace data based on the execution statuses of the steps traced by the synchronous group step trace setting program, and a step trace display for displaying the step trace data generated by the synchronous group step trace execution program.

A programmable controller of a fourth embodiment of the invention comprises a joint trigger step trace setting program which synchronizes trigger steps of certain blocks, and synchronously traces the execution statuses of steps of other blocks when a trigger step of any block whose trigger step is of the joint trigger type is executed. The programmable controller further comprises a joint trigger step trace execution program which creates step trace data based on the execution statuses of the steps traced by the joint step trace setting program, and a step trace display for displaying the step trace data generated by the joint step trace execution program.

A programmable controller of a fifth embodiment of the invention comprises master/slave block joint activation step trace setting program which automatically synchronously traces the steps of sub blocks when triggered by a trigger step of a set block. The programmable controller further comprises a master/slave block joint activation step trace execution program which creates step trace data based on the execution statuses of the steps traced by the master/slave block joint activation step trace setting program, and a step trace display for displaying the step trace data generated by the master/slave block joint activation step trace execution program.

The present invention further provides an SFC program execution method for a programmable controller comprising a selection step in which a step trace menu is displayed which includes a plurality of step trace menu items, a step in which a menu item is selected, a step of creating step trace data based on the selected menu item, defining the execution status of active steps, and a display step in which the trace data is displayed. The displayed trace data represents a history of the execution statuses of active steps.

BRIEF DESCRIPTION OF THE DRAWINGS

These and other objects and advantages of the invention will become more apparent and more readily appreciated from the following detailed description of the presently preferred exemplary embodiments of the invention taken in conjunction with the accompanying drawings, of which:

FIG. 3 is an illustration of a synchronous block-to-block step trace setting screen according to an embodiment of the present invention;

FIG. 4 is an illustration of a synchronous group step trace setting screen according to an embodiment of the present invention;

FIG. 5 is an illustration of a joint trigger step trace setting screen according to an embodiment of the present invention;

FIG. 6 is an illustration of a master/slave block joint activation step trace setting screen according to an embodiment of the present invention;

FIG. 7 is an illustration of a step trace display screen according to an embodiment of the present invention;

FIG. 8 shows a sequence of operations from step trace setting to display according to an embodiment of the present invention;

FIG. 17 illustrates an example of a conventional SFC program;

FIG. 18 is an illustration of a conventional step trace setting screen;

FIG. 19 is an illustration of a conventional step trace display screen;

DESCRIPTION OF THE PREFERRED EMBODIMENTS

Figure 1:
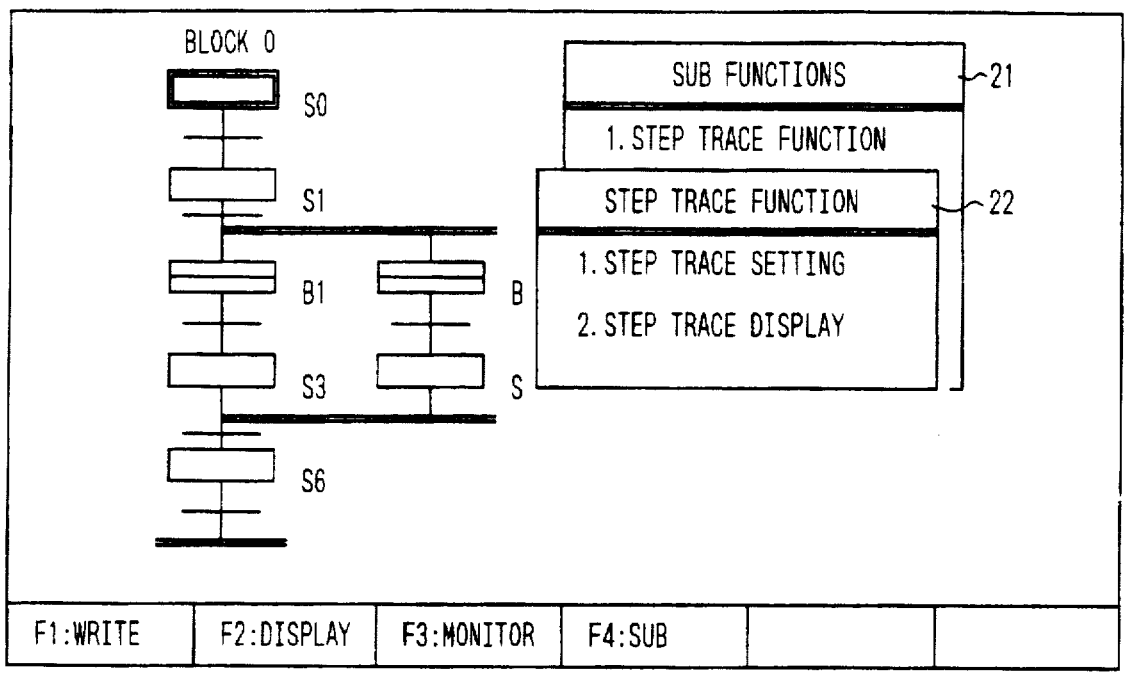
FIG. 1 is an illustration of a step trace setting screen according to an embodiment of the present invention.
Figure 2:
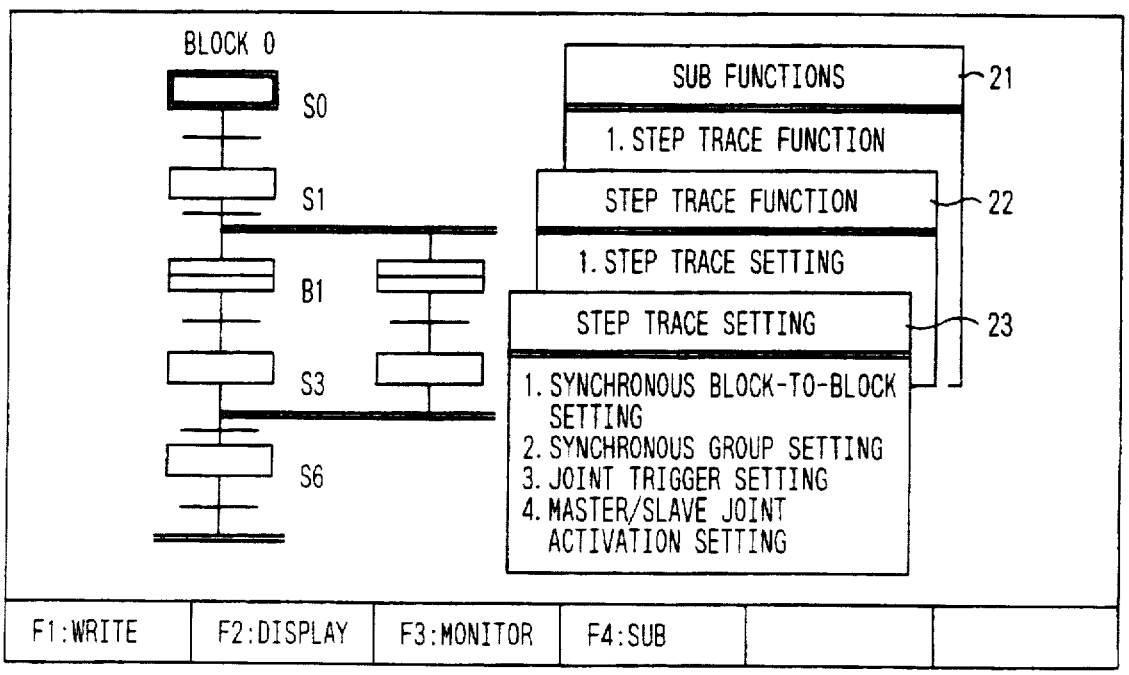
FIG. 2 is a further illustration of the step trace setting screen according to an embodiment of the present invention.

FIGS. 1 to 6 are illustrations of the SFC operation screens of a peripheral device (not shown) of a first embodiment of the present invention. As shown in FIG. 1, a menu screen 21 is used to select a step trace function on the operation screen, and a menu screen 22 used to further select a step trace setting or a step trace display. As shown in FIG. 2, a menu screen 23 can be used to select any of various step trace setting programs to perform tracing of the steps.

FIGS. 3 to 6 indicate various screens 24–27, which can be used to designate a particular type of display for the step tracing, and menu items displayed at the bottom of each of the screens shown in FIGS. 3 to 6 designate functions which can be specified by corresponding function keys (not shown). As shown in FIG. 7, a step trace display screen 28 is displayed when the step trace display has been selected.

The operation of the first embodiment will now be described.

FIG. 8 is a flowchart showing a sequence of step trace setting and step trace result display operations. In step 100, the sub function menu screen 21 is displayed on the SFC operation screen of the peripheral device, as illustrated in FIGS. 1 or 2, by selecting the function key F4. When the step trace function is selected in step 101, the step trace function menu screen 22 is displayed. Further, when the step trace setting is selected in step 102, the step trace setting menu screen 23 is displayed.

When any of the step trace settings is selected in step 103, the processing progresses to any of steps 104 to 107, where a corresponding screen, which is one of screens 24 to 27 shown in FIGS. 3 to 6, respectively, is displayed, and the corresponding setting program is executed in any of steps 104 to 107.

In step 108, when the function key F4 is selected on any of the step trace setting screens 24 to 27, execution of the step tracing begins. Further, when the function key F1 is selected in step 109 at completion of the step tracing, the trace data is read. Subsequently, in step 110, when the function key F2 is selected, the step trace display screen 28, shown in FIG. 7, is displayed, which allows a user to view the execution history of steps in each block. Hence, user can check the steps with reference to a specified trigger step.

A second embodiment of the present invention will now be described.

Figure 9:
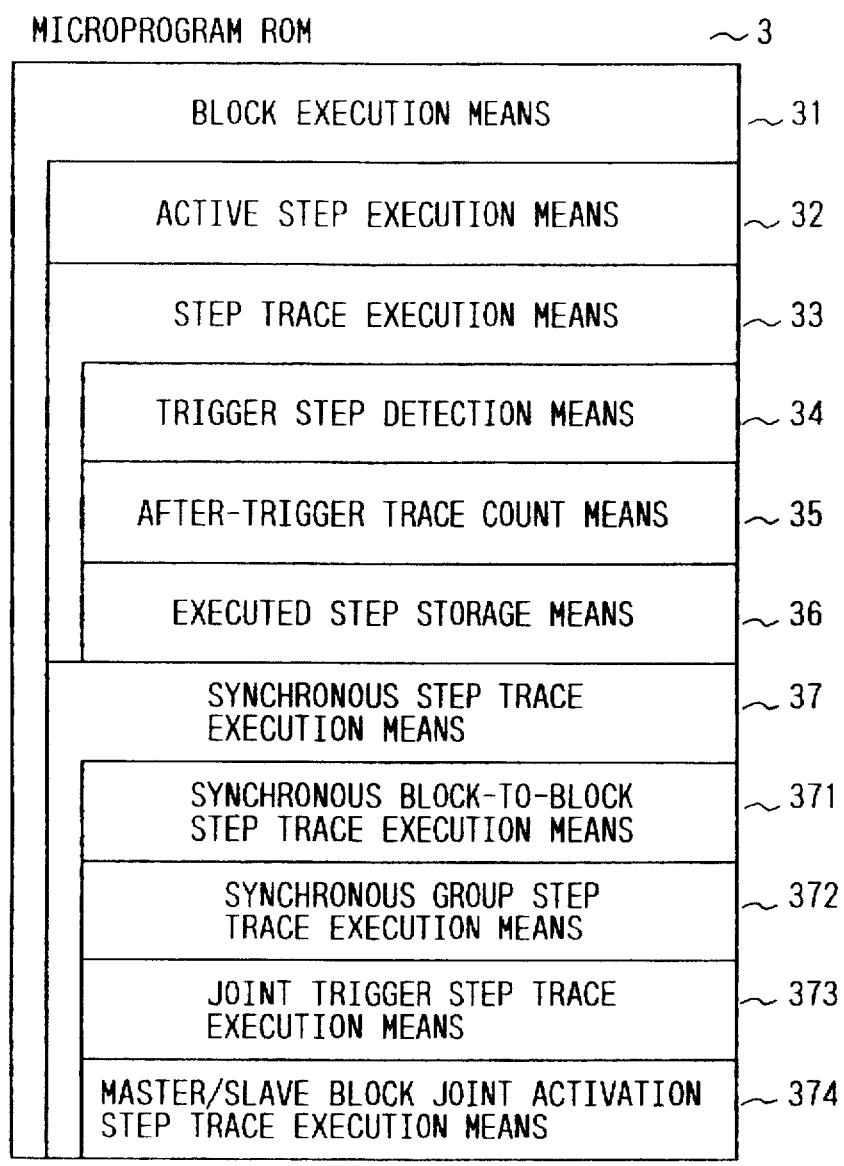
FIG. 9 illustrates an example of the contents of a microprogram ROM in a PC according to a second embodiment of the present invention.
Figure 14:
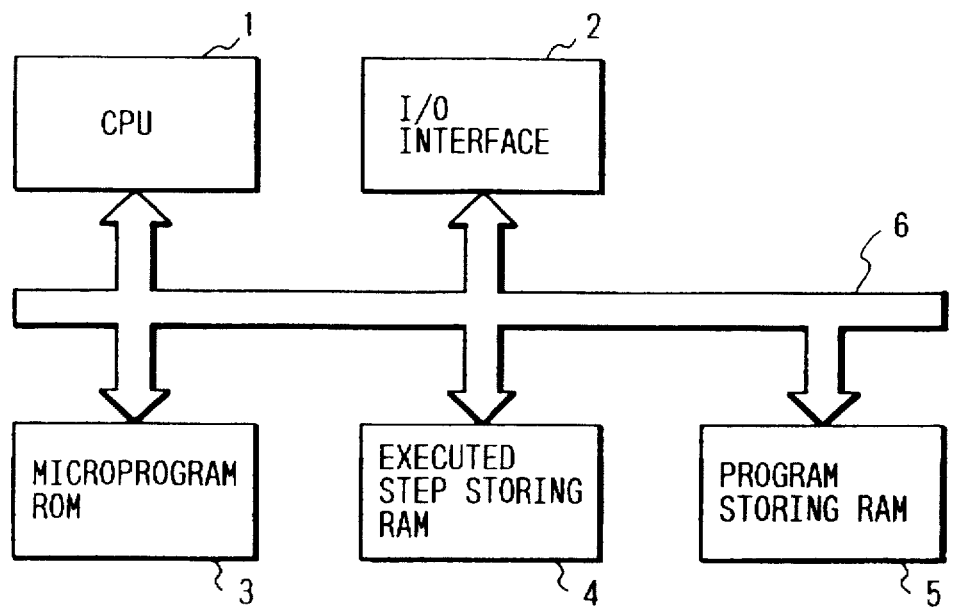
FIG. 14 is a block diagram illustrating a conventional PC.
Figure 15:
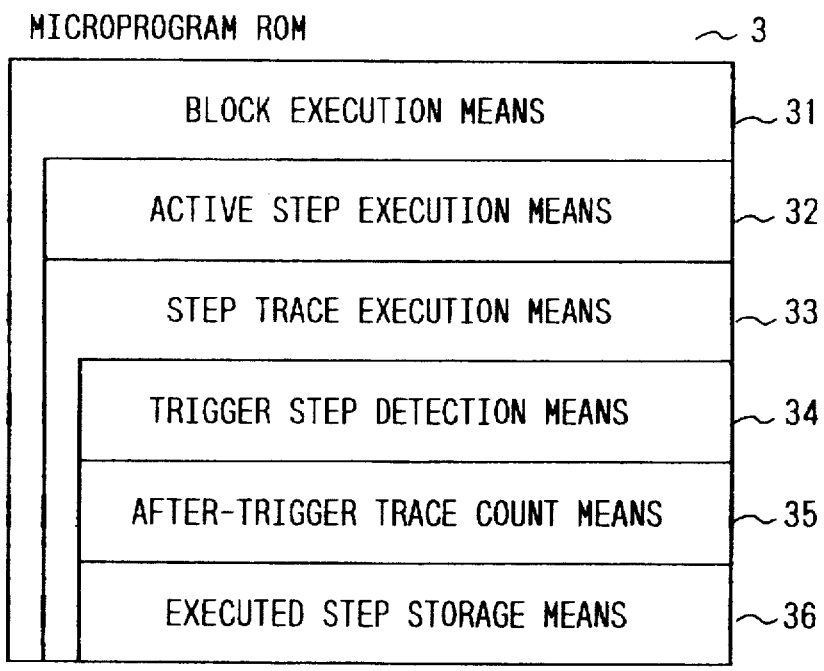
FIG. 15 is an illustration of a microprogram ROM in the conventional PC.
Figure 16:
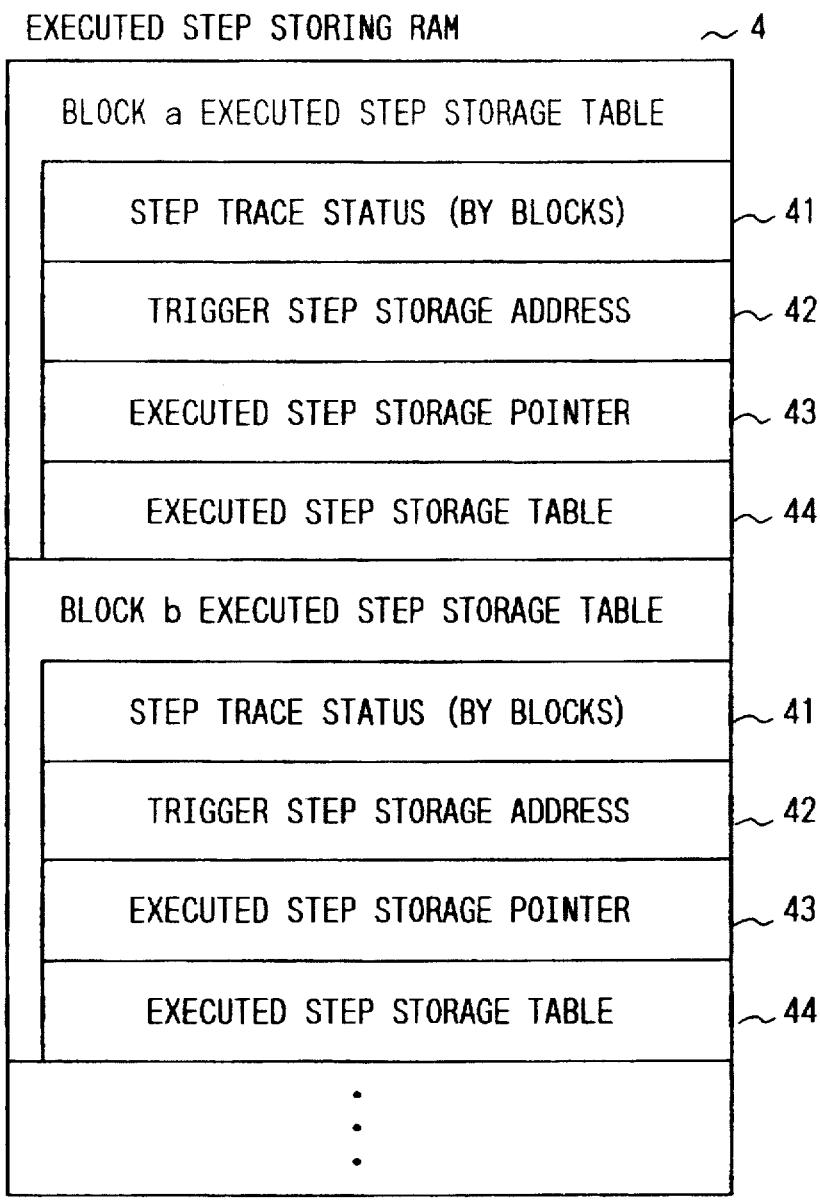
FIG. 16 is an illustration of an executed step storing RAM in the conventional PC.
Figure 20:
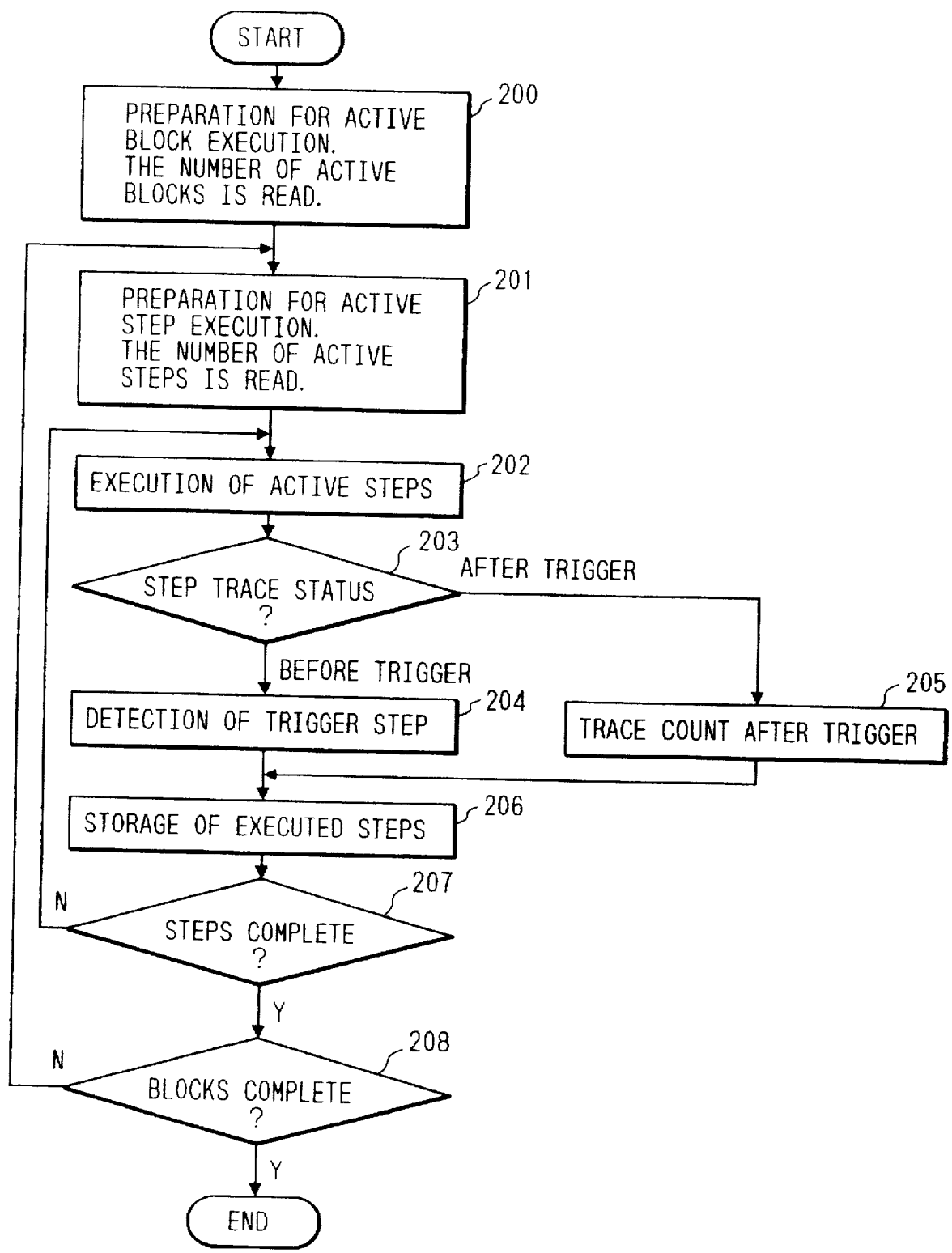
FIG. 20 is a flowchart illustrating a sequence of operations wherein the active steps of specified blocks are stored concurrently with the execution of the conventional SFC program.
Figure 21:
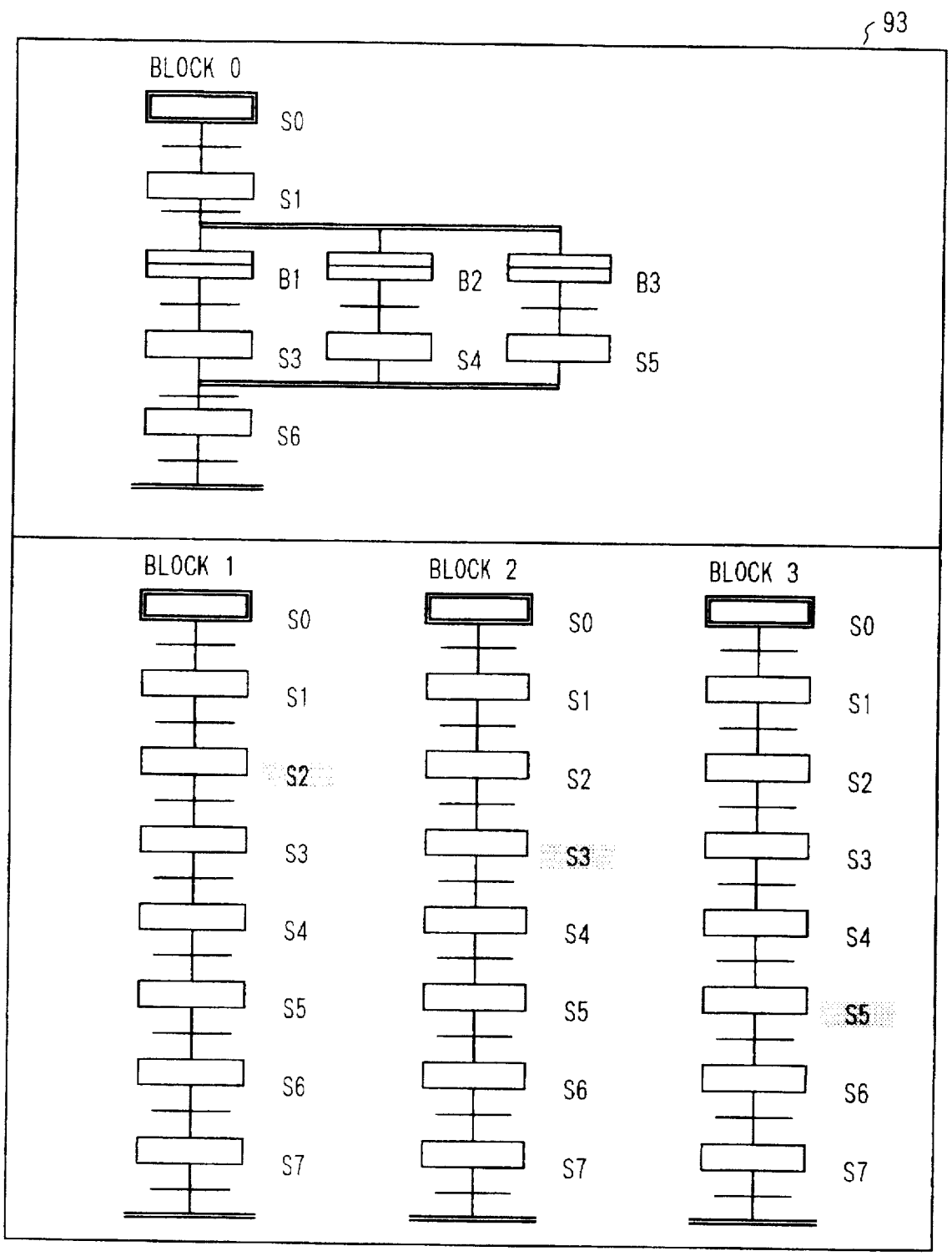
FIG. 21 illustrates an example of a conventional SFC program to be traced.

FIG. 9 is an illustration of the contents of the microprogram RAM 3 of the PC illustrated in the block diagram of FIG. 14. In FIG. 9, items 31 to 36 are identical to those of the conventional art.

Synchronous step trace execution program 37, which implements block-to-block synchronization, consists of execution programs 371 to 374, each having individual functions, and is compatible with each embodiment of the present invention. In particular, synchronous block-to-block step trace execution program 371 implements block-to-block synchronization.

As described above, FIGS. 1 to 6 are illustrations of step trace setting screens on which the blocks to be traced and the corresponding trigger steps are set by the step trace setting program 23 of the first embodiment. For example, FIG. 3 indicates a synchronous block-to-block step trace setting screen 24 by which block-to-block synchronization is specified in the peripheral device (not shown).

Figure 10:
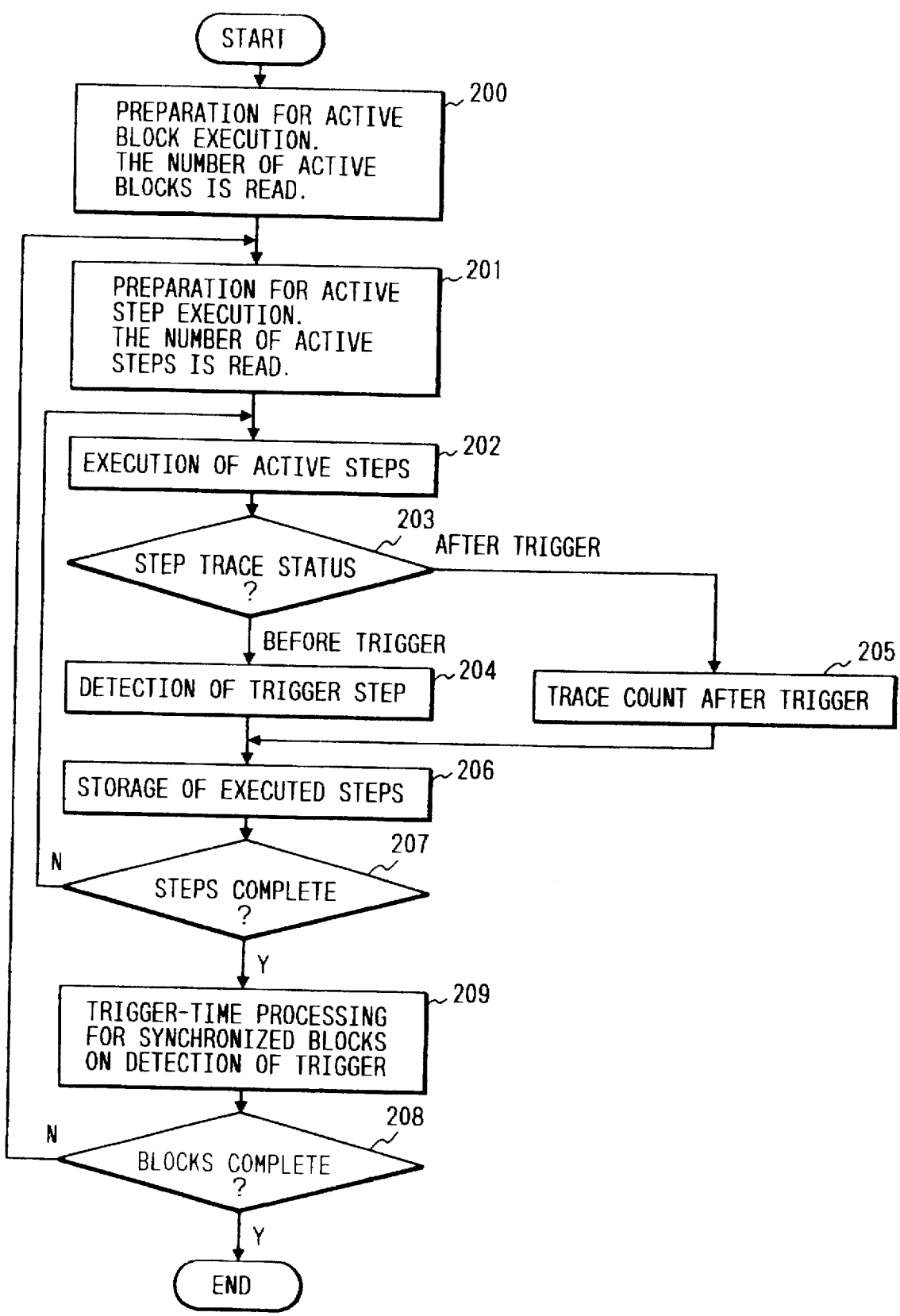
FIG. 10 is a flowchart illustrating a sequence of operations wherein the active steps of specified blocks are stored concurrently with the execution of an SFC program according to the second embodiment of the present invention.

FIG. 10 is a flowchart illustrating a sequence of operations in which the active steps of the specified blocks are stored simultaneously with the execution of the SFC program loaded from the peripheral device (not shown) to the PC. Steps 200 to 208 are identical to those performed by the conventional PC. However, during step 209, upon detection of a trigger step, trigger-time processing of synchronized blocks is performed by the synchronous block-to-block step trace execution program 371 to implement block-to-block synchronization.

Operation of the second embodiment will now be described.

When the synchronous block-to-block step trace setting screen 24 is displayed as shown in FIG. 3, the blocks to be step-traced are displayed in the BLOCK section. B1 to B4 indicate blocks 1 to 4. Since a plurality of blocks can be activated concurrently, a plurality of blocks to be traced can be set.

In the TRIGGER STEP section, steps are displayed from which the step traces of the corresponding blocks are referenced. In this example, S2 represents step 2. The trigger step is displayed only for the block which references the other blocks, and is not displayed for the other blocks. The triggering of the other blocks is effected by this trigger step of the reference block, thus, blocks are synchronized.

After this trigger step has been executed, the CPU traces the set number of steps (not shown), and the execution history of the preceding and succeeding steps in reference to that trigger step are traced and displayed by the peripheral device. Hence, synchronization of the blocks can be provided because the other blocks use the trigger step of the reference block as their trigger step.

FIG. 10 is a flowchart illustrating a sequence of operations of an SFC program of the second embodiment of present invention.

As shown in step 200, the number of active blocks to be processed by the block execution program 31 is read. Then, in step 201, the number of active steps to be executed by the active step execution program 32 is read.

Subsequently, the active steps are read and executed in step 202. In step 203, it is determined whether the step trace status data 41 indicates whether the step trace is before a trigger step (before-trigger status) or after a trigger step (after-trigger status). If the step trace status data 41 indicates the before-trigger status, the processing progresses to step 204 where the trigger step detection program 34 determines whether the executed step is a trigger step.

However, if the step trace status data indicates the after-trigger status, in step 205, the after-trigger trace count program 35 counts the number of executed steps traced after the trigger step. When the after-trigger trace count program 35 determines that all the executed steps after the trigger step have been traced, the step trace of the corresponding block is completed.

When, in step 204, the executed step is identified as a trigger step, the step trace status data 41 is changed to the after-trigger status, and the then value of the executed step storage pointer data 43 is set in the trigger step storage address 42. Subsequently, in step 206, the executed step numbers are stored in the executed step storage table 44 in the executed step storage RAM 4 by the executed step storage program 36 in cooperation with the executed step storage pointer 43.

In step 207, it is determined if all the steps of the block have been executed. If not, the processing returns to step 202, and the above processing is repeated for the next step in the block. If, however, in step 207, it is determined that all the steps in a block are completed, the processing proceeds to step 209.

In step 209, if the executed step is detected to be a trigger step in step 204 after all the active steps in the blocks have been executed, the step trace status data 41 is changed to the after-trigger status, and the executed step storage pointer data 43 is set to the trigger step storage address data 42 by the synchronous block-to-block step trace execution program 371 for the synchronization-specified blocks specified on the synchronous block-to-block step trace setting screen 24. If the executed step is not detected to be a trigger step, no processing occurs in step 209. In any event, the processing proceeds from step 209 to step 208.

In step 208, it is determined whether all blocks are completed. If so, the processing ends. However, if all blocks are not completed, the processing returns to step 201 and is repeated for the next block.

This completes the trigger-time processing for the synchronization-specified blocks.

A third embodiment of the present invention will now be described..

In FIG. 9, items 31 to 36 are identical to those of the conventional art and will not be described here. As described above, synchronous step trace execution program 37 implements the synchronization of blocks, and includes synchronous group step trace execution program 372 which implements group synchronization.

Figure 11:
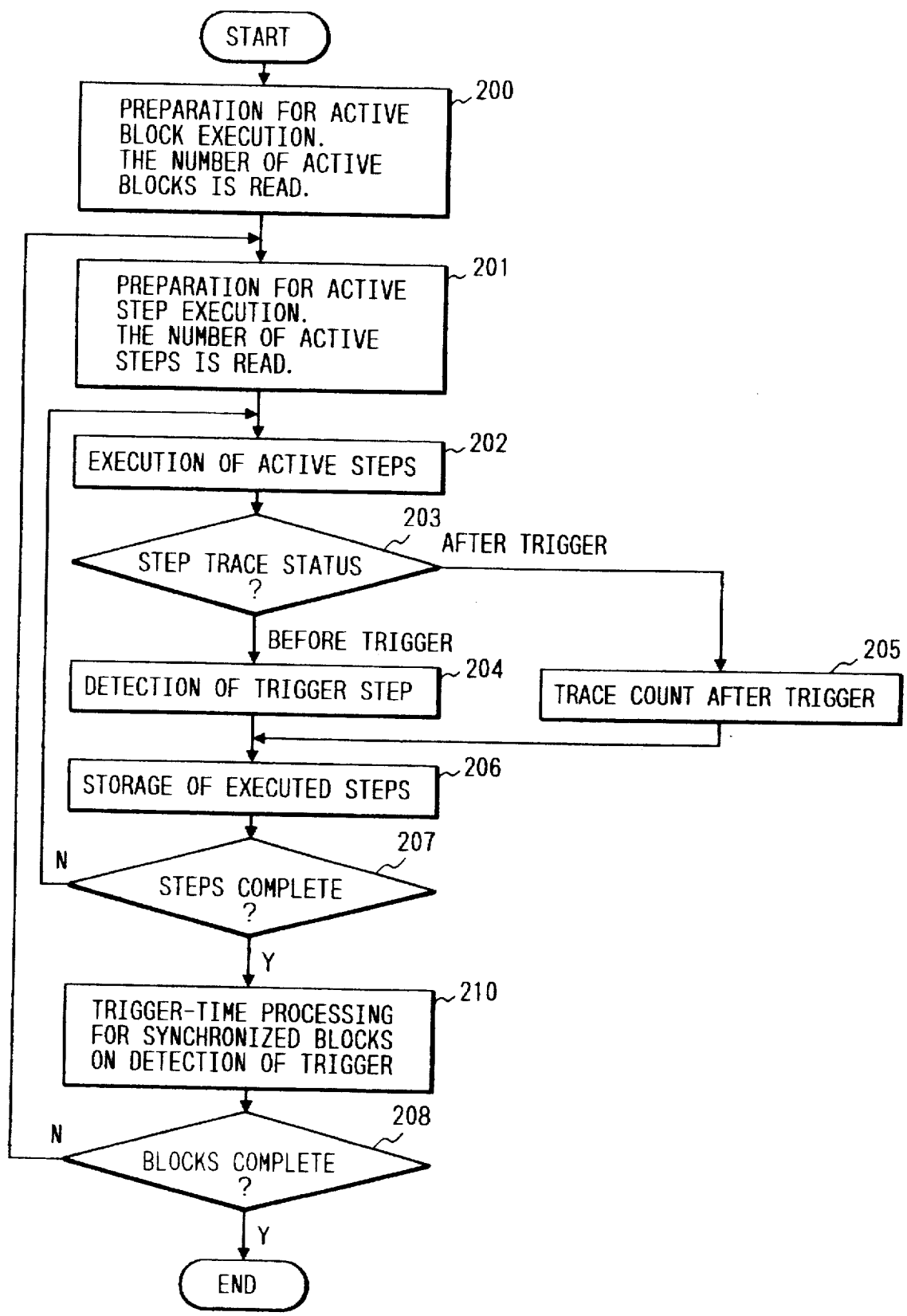
FIG. 11 is a flowchart illustrating a sequence of operations wherein the active steps of specified blocks are stored concurrently with the execution of an SFC program according to a third embodiment of the present invention.

As shown in FIG. 4, the peripheral device (not shown) displays synchronous group step trace setting screen 25 on which group synchronization is specified. In FIG. 11, steps 200 to 208 are identical to those of the conventional art. However, in step 210, upon detection in step 204 that the executed step is a trigger step, trigger-time processing of synchronized blocks is performed by the synchronous group step trace execution program 372 to implement synchronization of the blocks.

The operation of the third embodiment will now be described.

By specifying the grouping of the blocks to be synchronized on the synchronous group step trace setting screen shown in FIG. 4, in addition to the setting of the synchronous block-to-block step trace setting screen of the first embodiment, relevant blocks can be grouped.

After the trigger steps have been executed, the CPU traces the set number of steps (not shown) and the execution history of the preceding and succeeding steps in reference to the trigger steps can be traced and displayed by the peripheral device. Since the other blocks in the same groups use the trigger step of the reference block as their trigger step, blocks in the same group can be synchronized with each other.

In the flowchart shown in FIG. 11, processing from steps 200 to 208 occurs identically to that of the first embodiment described above. However, in step 210, if the executed step is detected as a trigger step in step 204 after all the active steps in the blocks have been executed, the step trace status data 41 is changed to the after-trigger status, and the value of the executed step storage pointer 43 is set to the trigger step storage address 42 by the synchronous group step trace execution program 372 for all the synchronization-specified blocks of the same groups specified on the synchronous group step trace setting screen 25. This completes the trigger-time processing for the synchronization-specified blocks.

A fourth embodiment of the present invention will now be described.

As described above, in FIG. 9, items 31 to 36 are identical to those of the conventional art, and synchronous step trace execution program 37 implements the synchronization of blocks, and includes joint trigger step trace execution program 373 which implements a joint trigger. As shown in FIG. 5, the peripheral device (not shown) displays a joint trigger step trace setting screen 26 on which a joint trigger step is specified.

Figure 12:
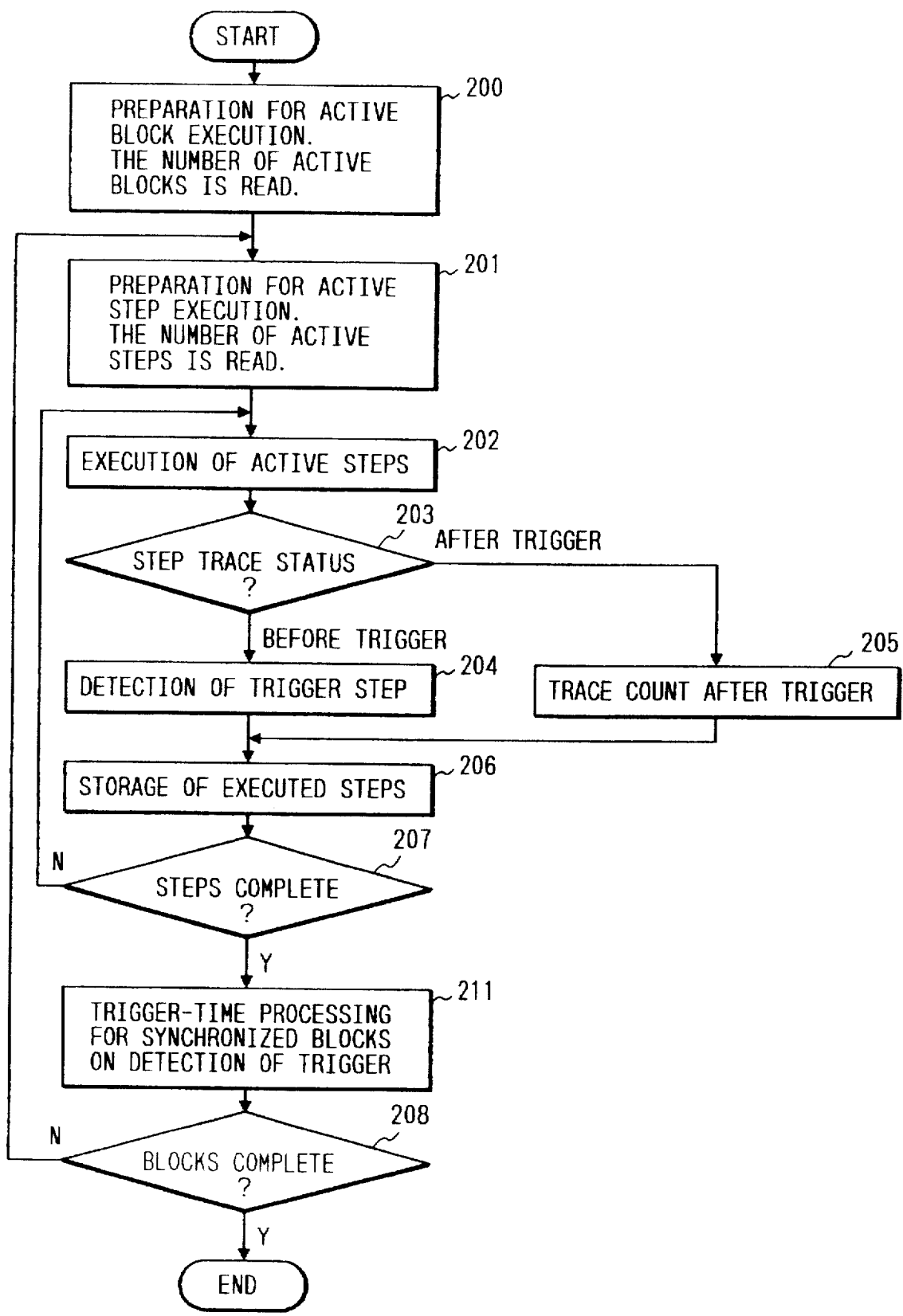
FIG. 12 is a flowchart illustrating a sequence of operations wherein the active steps of specified blocks are stored concurrently with the execution of an SFC program according to a fourth embodiment of the present invention.

In the flowchart of FIG. 12, as in the previous embodiments, steps 200 to 208 are identical to those of the conventional art. However, in step 211, the trigger-time processing of synchronized blocks on detection of a trigger is performed by the joint trigger step trace execution program 373 to implement a joint trigger step.

The operation of this fourth embodiment will now be described.

On the joint trigger step trace setting screen shown in FIG. 5, the trigger steps are set to the blocks in the groups in the setting of the synchronous group step trace setting screen as in the second embodiment. When the trigger steps in any of the blocks in the groups are executed, the other blocks in the groups are triggered jointly therewith to provide synchronization of the blocks.

After the trigger steps have been executed, the CPU traces the set number of steps (not shown) and the execution history of the preceding and succeeding steps in reference to said trigger steps can be traced and displayed by the peripheral device. Since the other blocks in the same groups use the trigger steps of the reference blocks as their trigger steps, the blocks in the same groups can be synchronized with each other.

Accordingly, processing from steps 200 to 208 in the flowchart shown in FIG. 12 is identical to that in the second embodiment. However, in step 211, if the executed step is detected to be a trigger step in step 204 after all the active steps in the blocks have been executed, the step trace status data 41 is changed to the after-trigger status, and the value of the executed step storage pointer 43 is also set to the trigger step storage address 42 by the joint trigger step trace execution program 373 for all the synchronization-specified blocks in the group specified on the joint trigger step trace setting screen 26. This completes the trigger-time processing for the synchronization-specified blocks.

A fifth embodiment of the present invention will now be described.

As in the previous embodiments, items 31 to 36 in FIG. 9 are identical to those of the conventional art, and synchronous step trace execution program 37 implements the synchronization of blocks. The synchronous step trace execution program 37 includes master/slave block joint activation step trace execution program 374 which implements master/slave block joint activation.

As shown in FIG. 6, the peripheral device (not shown) displays a master/slave block joint activation step trace setting screen 27 on which master/slave block joint activation is specified.

Figure 13:
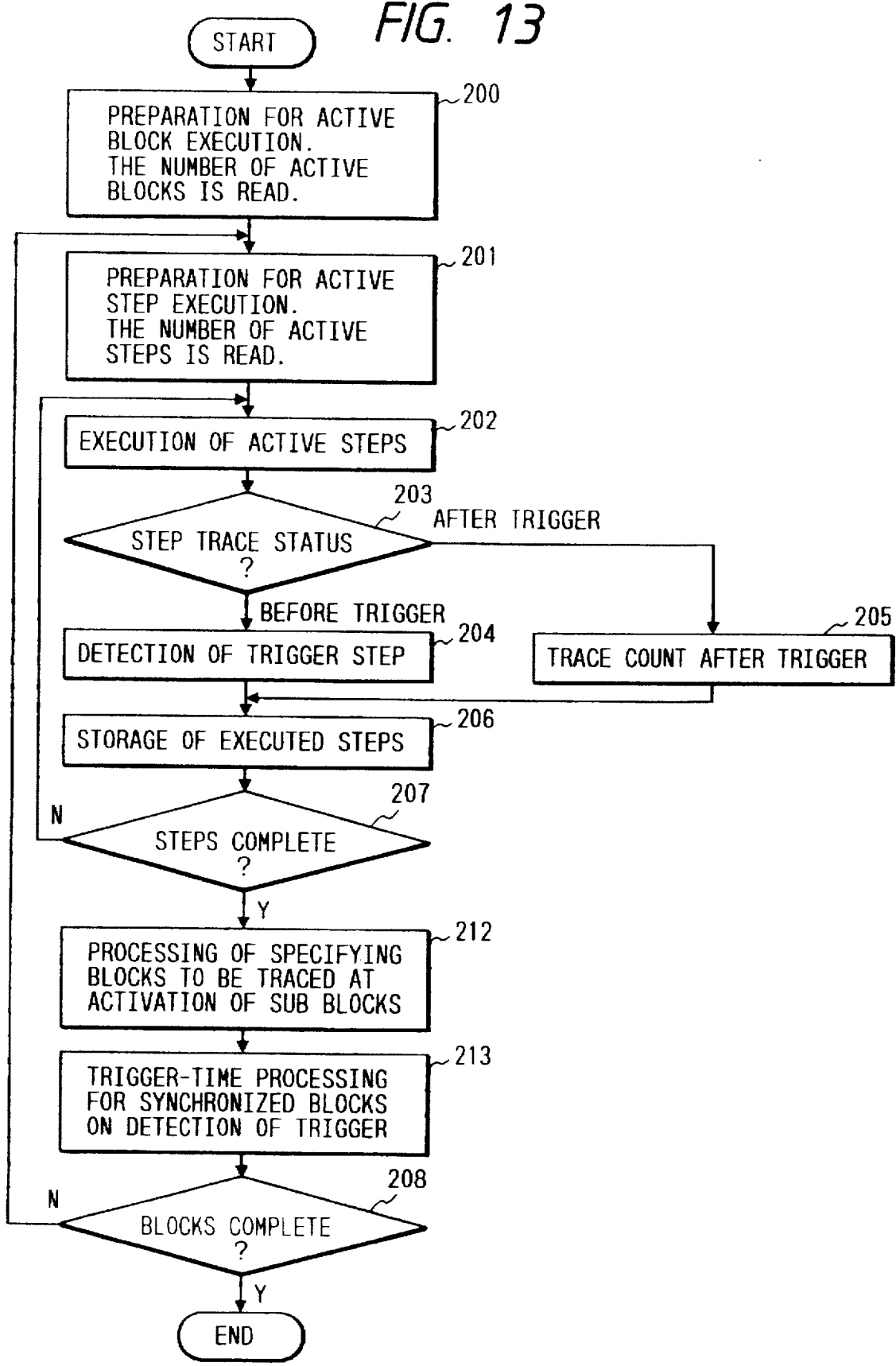
FIG. 13 is a flowchart illustrating a sequence of operations wherein the active steps of specified blocks are stored concurrently with the execution of an SFC program according to a fifth embodiment of the present invention.

Steps 200 to 206 in the flowchart shown in FIG. 13 are identical to those of the conventional art. However, in step 212, sub blocks are defined as blocks to be traced by the master/slave block joint activation step trace execution program 374 when the master/slave joint activation-specified blocks have activated the sub blocks to implement master/slave block joint activation. Further, in step 213, trigger-time processing of synchronized blocks upon detection of a trigger step is performed.

It should be noted that when the blocks have activated the sub blocks, the activation source blocks are referred to as the master blocks and the activation destination sub blocks as the slave blocks.

The operation of the fifth embodiment will now be described.

On the master/slave block joint activation step trace setting screen shown in FIG. 6, the trigger steps are set only in the master blocks and thus, master/slave block joint activation is specified without the slave blocks being set. This allows the sub blocks activated to be automatically synchronized to execute the step trace.

After the trigger steps have been executed, the CPU traces the set number of steps (not shown), and the execution history of the preceding and succeeding steps in reference to said trigger steps can be traced and displayed by the peripheral device. Since the slave blocks use as their trigger step the trigger step of the master block, the master and slave blocks can be synchronized with each other.

Processing from steps 200 to 208 in the flowchart shown in FIG. 13 is identical to that in the first embodiment. However, in step 212, if the block activation steps are executed in step 202 after all the active steps in the blocks have been executed, the activation destination slave blocks are defined as the blocks to be traced by the master/slave joint activation step trace execution means program in accordance with the master/slave block joint activation designation on the master/slave block joint activation step trace setting screen 27. Subsequently, in step 213, if the executed step is determined in step 204 to be a trigger step, the step trace status data 41 is changed to the after-trigger status and the then value of the executed step storage pointer data 43 is set to the trigger step storage address 42 for the slave blocks. This completes the trigger-time processing for the synchronization-specified blocks.

It is apparent, from the above embodiments, that the present invention provides an SFC program execution method for a programmable controller comprising the steps of displaying a step trace menu including at least one step trace menu item identifying a manner in which a history of the active step execution statuses of a plurality of blocks is traced, selecting one of the step trace menu items, creating step trace data based on the selected step trace menu item, and displaying the step trace data in the manner indicated by the selected step trace menu item to allow the execution history of steps in each block to be checked in reference to a specified trigger step.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A programmable controller for executing an SFC program and displaying a history of execution statuses of active steps of a plurality of concurrently executable blocks of an SFC program, comprising:

first means for synchronously tracing a history of execution statuses of active steps of a specified number of said plurality of blocks during execution of said SFC program, said first means including step trace setting means for designating a step of one of said plurality of blocks as a trigger step and for specifying said specified number of said plurality of blocks whose execution statuses of active steps are to be traced, execution of said trigger step triggering synchronous step traces in said specified number of said plurality of blocks; and second means for creating step trace data based on said execution statuses of said steps traced by said first means.

2. A programmable controller as claimed in claim 1, wherein:
said step trace setting means comprises synchronous block-to-block step trace setting means for synchronously tracing execution statuses of said active steps of said specified number of said plurality of blocks when a trigger step of a predetermined block is executed; and
said second means includes step trace execution means comprising synchronous block-to-block step trace execution means for synchronously creating said step trace data based on said execution statuses of said steps traced by said block-to-block step trace setting means.

3. A programmable controller as claimed in claim 1, wherein:
said step trace setting means comprises synchronous group step trace setting means for grouping blocks to be synchronized, setting a trigger step for each group, and, for each group, synchronously tracing said active steps of blocks within the group when said trigger step for the group is executed; and
said second means includes step trace execution means comprising synchronous group step trace execution means for synchronously creating said step trace data based on said execution statuses of said steps traced by said step trace setting means.

4. A programmable controller as claimed in claim 1, wherein:
said step trace setting means comprises joint trigger step trace setting means for setting trigger steps in certain of said plurality of blocks to be synchronized and tracing execution statuses of said steps of other said blocks when one of said trigger steps is executed; and
said second means includes step trace execution means comprising joint trigger step trace execution means for creating said step trace data based on said execution statuses of said steps traced by said joint trigger step trace setting means.

5. A programmable controller as claimed in claim 1, wherein:
said step trace setting means comprises master/slave block joint activation step trace setting means for identifying one of said blocks as a master block and at least one other block as a slave block, setting a trigger step in said master block, and automatically synchronously tracing said slave blocks when said trigger step is executed; and
said second means includes step trace execution means comprising master/slave block joint activation step trace execution means for creating said step trace data based on said execution statuses of said steps traced by said master/slave block joint activation step trace setting means.

6. A programmable controller as claimed in claim 1, further comprising step trace display means for displaying said step trace data.

7. The programmable controller as claimed in claim 1, wherein said step trace setting means comprises:
means for displaying a step trace menu including at least one step trace menu item indicating a manner in which said history is to be traced;
means for selecting one of said step trace menu items;
means for creating step trace data of traces of said actives steps based on said selected step trace menu item; and
means for displaying said step trace data in a manner indicated by said selected step trace menu item.

8. An SFC program execution method for a programmable controller for displaying a history of execution statuses of active steps of a plurality of concurrently executable blocks of an SFC program during execution of said SFC program, comprising the steps of:
designating a step of one of said plurality of blocks as a trigger step;
specifying a specified number of said plurality of blocks whose execution statuses of said active steps are to be traced;
upon execution of said trigger step, synchronously tracing execution statuses of said active steps of said specified number of said plurality of blocks; and
creating step trace data based on said execution statuses of said traced steps.

9. The method as claimed in claim 8, wherein said setting step comprises the steps of:
displaying a step trace menu including at least one step trace menu item indicating a manner in which said history is to be traced;
selecting one of said step trace menu items; and
displaying data of traces of said active steps in a manner indicated by said selected step trace menu item.

10. A method as claimed in claim 9, wherein:
said trigger step is a trigger step of a predetermined one of said blocks; and
said creating step synchronously creates said step trace data based on said execution statuses of said traced steps.

11. A method as claimed in claim 9, wherein:
said setting step further comprises the steps of:
grouping blocks to be synchronized; and
setting a trigger step for each group; and
said tracing step traces said active steps of said blocks synchronously for each of said groups when said trigger step is executed; and
said creating step synchronously creates said step trace data based on said execution statuses of said traced steps.

12. A method as claimed in claim 9, wherein:
said setting step further comprises the step of setting trigger steps in certain of said plurality of blocks to be synchronized, and said tracing step traces execution statuses of said steps of other said blocks when one of said trigger steps is executed; and
said creating step creates said step trace data based on said execution statuses of said steps traced after said one of said joint trigger steps is executed.

13. A method as claimed in claim 9, wherein:
said setting step further comprises the steps of:
identifying one of said blocks as a master block and at least one of said blocks as a slave block; and
identifying a trigger step in said master block; and
said tracing step automatically synchronously traces active steps in said slave blocks when said trigger step is executed; and
said creating step creates trace data based on said execution statuses of said traced steps of said slave blocks.

14. A method as claimed in claim 9, further comprising the step of displaying said step trace data.

* * * * *